United States Patent [19]

Downer et al.

[11] 4,155,739

[45] May 22, 1979

[54] BORON-CONTAINING SPRAY OIL COMPOSITION FOR FOLIAR APPLICATION

[75] Inventors: John D. Downer; Clarence A. L. Phillips, both of Pointe-a-Pierre, Trinidad and Tobago

[73] Assignee: Texaco Trinidad, Inc., Pointe-a-Pierre, Trinidad and Tobago

[21] Appl. No.: 842,859

[22] Filed: Oct. 17, 1977

[51] Int. Cl.² ............................................ C05C 11/00
[52] U.S. Cl. ........................................ 71/27; 71/11; 71/DIG. 2; 260/462 R
[58] Field of Search .................... 71/11, 31, 54, 64 C, 71/DIG. 2, 27; 260/462 R, 462 A, 462 C

[56] References Cited

U.S. PATENT DOCUMENTS

| | | | |
|---|---|---|---|
| 3,065,236 | 11/1962 | Matheson et al. | 260/462 R |
| 3,100,221 | 8/1963 | Kay | 260/462 R |
| 3,185,644 | 5/1965 | Knowles | 260/462 R |
| 3,203,971 | 8/1965 | De Gray et al. | 260/462 R |
| 3,346,494 | 10/1967 | Robbins et al. | 71/64 C |
| 4,026,694 | 5/1977 | Gross et al. | 71/64 C |

FOREIGN PATENT DOCUMENTS

| | | | |
|---|---|---|---|
| 722537 | 1/1955 | United Kingdom | 260/462 R |
| 467585 | 8/1976 | U.S.S.R. | 71/31 |

OTHER PUBLICATIONS

Chem. & Eng. News, vol. 36, No. 29, Jul. 21, 1958, pp. 112 and 113, "Borester Boric Acid Esters".
"Chemistry of Aryl Boric Acids", Acta Chem. Scand. 12, pp. 1373–1385, (1958).

*Primary Examiner*—Joseph Scovronek
*Assistant Examiner*—C. Konkol
*Attorney, Agent, or Firm*—Thomas H. Whaley; Carl G. Ries; Henry W. Archer

[57] ABSTRACT

Disclosed are hydrolytically stable spray oil containing plant assimilating boron compounds for improving plant growth. Suitable boron compounds include the esters of boric, boronic and borinic acids including the cyclic esters, the alkanolamine esters, the non-alpha hydrogen and branched alkyl esters and amine-borate adducts. The spray oils are formulated to contain from 0.01 to 2.0 weight/volume percent of boron.

10 Claims, No Drawings

BORON-CONTAINING SPRAY OIL COMPOSITION FOR FOLIAR APPLICATION

FIELD OF THE INVENTION

This invention relates to novel, non-phytotoxic spray oil compositions for supplying boron to growing plants.

BACKGROUND OF THE INVENTION

Boron is one of the essential elements for proper plant growth. Boron deficiency in plants, such as citrus, causes curling of the leaf, embrittlement and brown coloration, resulting in a heavy shedding of young fruit. The element is required in relatively small quantities and is known as micronutrient along with some other essential elements such as zinc, manganese, copper, iron and molybdenum. The conventional method employed to combat boron deficiency is to apply an aqueous solution of borax—as much as 2 lb. per tree is used—which is wasteful because it is readily washed away by water.

The art is aware of many oil soluble boron compounds which heretofore have been used as additives in gasoline and lubricating oils. Organic esters of boric acid are used widely for this purpose. However, hydrolytic stability is an important property both in the storage and application of oils, and in general organic borates are poor in this respect. Certain organic esters of boric acid are more hydrolytically stable than others because of their special spacial arrangement which hinders hydrolytic fission. Triethanolamine borate is such a compound (Brown and Fletcher, J. Amer. Chem. Soc., 1951, 73, 2808) because of its cage like (triptych) structure. Indeed Steinberg and Hunter (Ind. Eng. Chem., 1957, 49, 174) have shown that the relative rates of hydrolysis of the aliphatic and alicylic borates are in the order predicted by the steric requirements in the nucleophilic attack by water on the boron atom. For example tri(diisobutylcarbinyl)borate is 50% hydrolysed in water at 21° C. only after 221 days. Borates with lipophilic groups, e.g., long chain alkyl, would also be expected to be relatively more hydrolytically stable. The more hydrolytically stable esters of boric acid and alkyl/aryl boronic acids include the cyclic esters, the alkanolamine esters, the non-alpha-hydrogen esters, and branched alkyl esters such as the tri-(methylisobutylcarbinyl)esters. Esters of polymeric hydroxyl compounds, e.g., the hydrolyzed copolymer of vinylacetate and $C_{16-18}$ alkanes, described in British Pat. No. 828,634 (Chem. Abs., 1960, 54, 13728b), are also suitable. Oil solubility might be a restriction with some of the esters but can be overcome by using a mixed carrier oil as described later. Alternatively the solubility of the borate can be improved by forming an adduct with an oil solubility moiety.

It is a primary object of the instant invention to provide novel, hydrolytically, stable boron-containing spray oils for economically and and efficiently supplying boron to plants.

In conjunction with the above object, it is also a highly significant object of the invention to provide an improved process for supplying boron to plants by foliar application thereto.

DISCLOSURE OF THE INVENTION

Broadly stated, the composition aspect of the present invention whereby the first stated object of the present invention is obtained resides in compositions containing a non-phytotoxic agricultural spray oil and an effective amount of an oil-soluble boron compound equivalent to 0.01 to 2.0 weight/volume percent of boron.

The process aspect of the present invention whereby the second stated object of the present invention is achieved resides in applying from 4 to 500 liters of the spray composition per hectare to the leaves or branches of plants.

There is an optimum dosage range (0.4 to 5 kg boron per hectare) for boron depending on the crop, the number and frequency of applications, the season and the soil boron status. Application of excess boron may cause crop damage. The toxicity symptoms are marginal and tip chlorosis quickly followed by necrosis the pattern of which follows the leaf venation. Control is application is therefore important. Ultra low volume (ULV) neat oil application facilitates control. The spray oil compositions disclosed are especially suitable for ULV application using micro-spraying techniques and equipment. Such compositions are also compatible with many oil soluble metal micronutrient spray oils such as those described in U.S. Pat. Nos. 3,661,550 and 4,003,994, which is a big advantage since a mixed micronutrient spray can be used involving only one application.

Borates, $B(OR)_3$, boronates $RB(OR)_2$ and borinates $R_2B(OR)$ in which R is a radical which may be alkyl, cycloalkyl, aryl, alkaryl or aralkyl are all suitable boron compounds. The organic radicals may or may not be the same in an individual ester but each ester should contain at least 6 carbon atoms. Boric, boronic and borinic acid esters derived from alkane and cycloalkane polyols and from alkanolamines are also satisfactory sources for boron. The preferred esters are (1) the cycloalkyl and branched alkyl esters made from secondary and tertiary alcohols since the hydrolytic stability of the esters formed increases with increased radical substitution on the carbon atom forming the C—O—B linkage, and (2) esters which sterically hinder hydrolytic fission. The cyclic ester of boric acid made from ethyl-2,4-dimethyl pentane-2,4-diol or 2-ethyl-2 hydroxymethyl-1,3-propane diol, tri-(diisobutylcarbinyl)-borate, tricyclohexylborate, the cyclic phenyl boronates made from propane-1,3-diol and phenyl ethane-1,2-diol, tripropanolamine borate, tri-(diisopropylcarbinyl)-borate and di-(diisobutylcarbinyl)borate are suitable specific compounds. Amine borate adducts and amine salts of tetra-covalent boron compounds also possess improved hydrolytic stability over the non-complexed compounds, such as Primene 81R boro-tetra-n-propylate.

A number of spray oils containing hydrophobic and sterically hindered alkyl borates were studied for non-phytotoxicity to plants. The general procedure for making these borate-containing spray oils is given in Example I. All the spray oils were non-phytotoxic at practical levels of application. The spray oil containing tri-(diisobutyl carbinyl) borate is preferred because it is the most hydrolytically stable of those prepared. Greenhouse trials were carried out with corn seedlings to demonstrate foliar uptake and assimilation of tri-(diisobutylcabinyl)borate carried in a typical petroleum spray oil with properties depictable in Table I. The agronomic procedure used is also given in Example I. The results are summarized in Table II. The tri-(diisobutylcarbinyl)borate spray oil treatment resulted in improved foliage and root growth in all three trails made, when compared with the corresponding boron-free spray oil treatment.

Tri-(diisobutylcarbinyl)borate has relatively low solubility in conventional petroleum spray oils of the type described in Table I. However, solubility may be improved by addition of a solvent in which the ester is more soluble. Thus solutions of the ester in toluene may be made containing up to 0.35% wt. boron. A toluene/acetone mixture (3:1) will carry up to 0.7% wt. boron in the form of the ester, and the resulting solution can be mixed in the spray oil (Table I) over a wide range. An even better solvent for the ester is ethylene glycol monomethyl ether (EGME). Such formulations of tri-(diisobutylcarbinyl)borate have been screened for non-phytotoxicity to seedling corn along with a spray oil containing an amine-adduct for comparison. The procedure is described in Example II and the results given in Table III. There were significant growth responses to the spray treatment on four of the eight parameters measured (Table III). The spray oil/ethylene glycol-monomethylether carrier without the boron compounds, in comparison with the unsprayed, significantly hindered seedling growth when the fresh tissue weight, the functional and total leaf areas are considered. Also, the mean fresh weight, the mean functional and total leaf areas respectively of seedlings sprayed with Primene 81R-tri-(n-propyl)borate in spray oil were smaller than those of seedling treated with the tri-(diisobutylcarbinyl)borate carried in the toluene/spray oil mixture. Although the damages caused by the oil sprays were by and large negligible, the overall mean score of seedlings treated with the Primene 81R-tri-(n-propyl)borate in spray oil were significantly higher than those of the tri-(diisobutylcarbinyl)borate in toluene/spray oil.

Spray oils containing borate-adducts with commercial amines were studied for comparison of their phytotoxicity with that of the spray oil containing tri-(diisobutylcarbinyl)borate. The method used is described in Example III. Four of the spray oils were checked out for phytotoxicity as described in Example III. All were more phytotoxic than tri-(diisobutylcarbinyl)borate.

The horticultural spray oils used here have a gravity API of 31–36, a viscosity at 100° F. of 81 to 87 Saybolt Universal Seconds and a boiling range between 600 and 775° F. For normal applications highly refined carrier oils, predominantly paraffinic, having a minimum API gravity of 27, viscosity at 100° F. of between 55 and 100 Saybolt Universal Seconds, boiling range of 600°–775° F. and minimum unsulphonated residue of 85%, are generally suitable. A lighter oil with API gravity around 50 and boiling point range 85°–600° F. belonging to the general groups of paraffins, isoparaffins and/or naphthenes is desirable for use with light-weight ultra low volume sprayers.

TABLE I

| ANALYSIS OF PREFERRED CARRIER OIL | |
|---|---|
| Sp. Gravity at 60° F. (ASTM D-1298) | 0.8493 |
| API Gravity (ASTM D-1250) | 35.1 |
| Flash Point, (COC), °F. (ASTM D-92) | 395 |
| Viscosity SUS/100° F. (ASTM D-445/2161) | 84.2 |
| Colour (ASTM D-1500) | 0.5 |
| Pour Point, °F. (ASTM D-97) | 5 |
| Neutralization No. mg.KOH/g. | 0.04 |
| Distillation, °F. (ASTM D-447) | |
| IBP | 637 |
| 10% | 675 |
| 50% | 696 |
| 90% | 729 |
| FBP | 745 |
| Ash, % wt. | 0.001 |
| Unsulphonated Residue, vol. % (ASTM D-483) | 94.2 |

The invention is further illustrated in nonlimiting fashion by the following Examples.

EXAMPLE I

General procedure for making spray oils containing alkyl borates:

Reflux a mixture of the alcohol or glycol (in slight excess of that required to form the tri ester), boric acid and toluene under a fractioning column and a Dean & Stark tube so as to remove the water formed during the reaction. Add the spray oil (Table I), strip the toluene and any unreacted alcohol from the reaction product and distil the residue to give the pure borate which is dissolved in the spray oil (Table I) to the desired concentration. Alternatively the required amount of spray oil to give the desired concentration can be added to the reaction mixture after removal of water, and the toluene and any unreacted alcohol removed by distillation provided the alcohol boils below that of the IBP of the spray oil. Spray oils containing the tri-esters of 2-octanol, diisobutylcarbinol, cetyl alcohol, diethylene glycol, and ethylene glycol monomethylether were prepared in this way.

Procedure for demonstrating foliar uptake:

Three greenhouse trials (AB & C) with corn seedlings were conducted to demonstrate foliar uptake and assimilation of the spray oil containing tri-(-diisobutylcarbinyl)borate. A constant level water culture technique based on E. J. Hewitt's "Sand and Water Culture Methods", Tech. Commun., (Revised 2nd Edn.), C.A.B. England, 1966, p 471, 472 and 490., was adapted with each culture unit consisting of a reservoir (10–15 l. capacity) supplying nutrient solution to 4 or 6 glass vessels each of about 800 ml. capacity. Each vessel carried a maximum of 4 seedlings. The solution in the growth vessels was constantly aerated. The macronutrient formula of Arnon and Hoagland and that of Arnon for the micronutrients were used for the culture solutions, prepared from deionized steam condensate and high purity compounds (Analar reagents); boron was excluded from the water culture. The tri-(-diisobutylcarbinyl)borate was applied in the spray oil (Table I) at the concentration of 0.02% w/v boron. The seedlings were treated, 2 ml. oil solution per two seedlings, at 7 days after transplanting the seedling to the growth vessel. The seedlings were allowed to grow for about 21 to 31 days after which time growth measurements were taken. It will be seen from Table II that there were positive responses in all cases except one.

TABLE II

FOLIAR APPLICATION AND ASSIMILATION OF TRI-(DIISOBUTYLCARBINYL)BORATE IN SPRAY OIL: MEAN TREATMENT EFFECT ON CORN SEEDLING GROWTH

| | Tissue Weight (gm) | | | | | | Leaf Area $Cm^2$ | | |
|---|---|---|---|---|---|---|---|---|---|
| | Fresh | | | Dry | | | | | |
| | Spray Oil only | Spray Oil with B | % Increase in wt. | Spray oil only | Spray oil with B | % Increase in wt. | Spray oil only | Spray oil with B | % Increase in area |
| | | | | FOLIAGE | | | | | |
| A | 24.7 | 28.1 | 114 | 2.05 | 2.28 | 111 | 856 | 934 | 109 |
| B | 60.7 | 67.4 | 111 | 5.58 | 6.20 | 111 | 1862 | 2026 | 109 |
| C | 42.2 | 54.9 | 130 | 3.1 | 5.0 | 161 | 637 | 778 | 122 |
| | | | | ROOT | | | | | |
| A | 13.9 | 25.3 | 182 | 0.6 | 0.8 | 133 | | | |
| B | 20.4 | 24.6 | 121 | 1.32 | 2.67 | 202 | | | |
| C | 19.9 | 23.5 | 118 | 1.4 | 1.2 | 86 | | | |

EXAMPLE II

A trial was conducted using seedling corn growth in peatmoss, vermiculite, sand and charcoal medium contained in plastic pots. The trial was of a simple randomised block design with ten treatments replicated three times in three blocks. In the trial, spray oils consisting of a 50/50 mixture of toluene or ethyleneglycolmonomethylether (EGME) and the oil described in Table I and containing tri-(-diisobutylcarbinyl)borate at two concentrations (0.05 and 0.1% w/v boron) were compared with the spray oil (Table I) containing Primene 81-R-tri-(n-propyl)borate at 0.05% w/v boron. The two 50/50 mixed carriers, the spray oil described in Table I and an unsprayed treatment were included as controls. The Primene 81R-tri-(-n-propyl)borate oil solution treatment was repeated twice (i.e. treatment Nos. 9 and 10). The corn seedlings were sprayed with the boron oil solutions and/or the carriers at the rate of 2 ml. solution per three pots (9 plants) seven days after the seeds were sown and then assessed for phytotoxic damages and harvested one and 14 days later respectively. The results are given in Table III.

EXAMPLE III

Amine-borate adducts:

The triesters of boric acid are first prepared, as described in Example I, from the appropriate alcohol or phenol. A stoichiometric amount of the amine is added to the ester with stirring and cooling, to prevent the temperature from rising by more than a few degrees, giving the amine-borate adduct. The following adducts were prepared Primene 81-R-tri-(-n-propyl)borate; Primene 81-R-boratetra-n-propylate; Primene 81-R-tri-(nonylphenyl)borate and Primene JMT-dihydrogen nonylphenyl borate. Primene JMT and 81-R are tert. alkyl primary amines of average molecular weights 315 & 195, respectively, sold by Rohm and Haas.

TABLE III

TRI-(DIISOBUTYLCARBINYL)BORATE PHYTOTOXICITY TRIAL: MEAN TREATMENT EFFECT ON GROWTH OF CORN SEEDLING

| | Seedling Growth Measurement | | | | | | | |
|---|---|---|---|---|---|---|---|---|
| | Height cm. | Weight in Gms Fresh | Dry | No. of Leaves | Leaf Area ($cm^2$) Non-Functional | Functional | Total | Phytotoxicity Score* |
| Control | 15.6 | 11.2 | 1.20 | 13.7 | 6.8 | 984.2 | 990.9 | 0.1 |
| Spray Oil (Table I) | 15.8 | 11.2 | 1.03 | 14.5 | 8.9 | 1073.2 | 1082.1 | 0.3 |
| Toluene/Spray Oil | 16.5 | 10.9 | 1.23 | 14.3 | 8.8 | 1145.9 | 1154.7 | 0.2 |
| EGME/Spray Oil | 11.6 | 4.8 | 0.47 | 13.0 | 5.3 | 568.8 | 574.1 | 0.2 |
| 0.05% B in Toluene/Spray Oil | 18.3 | 10.7 | 1.37 | 15.3 | 6.6 | 1199.5 | 1206.1 | 0.1 |
| 0.1% B in Toluene/Spray Oil | 17.6 | 13.4 | 1.30 | 15.3 | 11.6 | 1241.5 | 1253.1 | 0.1 |
| 0.05% B in EGME/Spray Oil | 17.4 | 10.5 | 1.10 | 14.0 | 6.1 | 954.8 | 960.9 | 0.3 |
| 0.1% B in EGME/Spray Oil | 17.9 | 12.1 | 1.17 | 14.3 | 18.0 | 1075.8 | 1093.7 | 0.1 |
| Primene Boron Spray Oil Solution (0.05% B) | 13.8 | 5.6 | 1.00 | 13.0 | 6.0 | 645.0 | 651.1 | 0.6 |
| Primene Boron Spray Oil Solution (0.05% B) | 14.2 | 6.9 | 0.90 | 13.7 | 3.4 | 733.4 | 736.7 | 0.1 |
| S.E. = | 1.35 | 1.53 | 0.223 | 0.70 | 4.84 | 133.46 | 135.04 | 0.07 |
| C.V. % = | 14.6 | 26.8 | 35.94 | 8.6 | 101.7 | 23.7 | 23.75 | 62.94 |

*0 = None; 1 = Slight; 2 = Moderate; 3 = Severe
Note:
EGME = Ethylene glycol monomethyl ether
B = Tri-(diisobutylcarbinyl)borate Phytotoxicity trials with spray oils containing these adducts were conducted on corn seedlings in the greenhouse. The corn seedlings were grown in the sand/peatmoss mixture (50/50) contained in six inch diam. plastic pots each carrying two plants. The seedlings were fertilized with Shive's solution and a 13:13:20/N:P:K fertilizer mixture. A simple randomised block experimental design was used with replicated treatments in separate blocks. Each pot formed an experimental plot. The oil solutions were applied to the seedling foliage with an artist air-brush about seven days after germination. Phytotoxicity assessments were made one day after the seedlings were sprayed. The boron contents of the solutions ranged from 0.125% to 1.2% w/v. The boron solutions were relatively phytotoxic to the corn seedlings the degree of phytotoxicity increasing with increasing boron concentration. The phytotoxicity score* at a boron concentration of 0.25% w/v is given below:

Primene 81R tri-nonylphenolborate . . . 3.0
Primene 81R boro-tetra-n-propylate . . . 1.0
Primene 81R tri-(-n-propyl)borate . . . 1.2
Primene JMT-dihydrogen nonylphenol borate . . . 3.0

*0=none; 1=slight; 2=moderate; 3=severe

What is claimed is:

1. A process for supplying boron to plants which comprises applying thereto a horticultural hydrolytically stable spray oil having a Gravity API of 31–50, a viscosity at 100° F. of 81 to 87 Saybolt Universal Seconds and a boiling range of 85° to 775° F. and a minimum unsulfonated residue of 85% and containing from 0.01 to 2.0 weight percent boron in the form of a hydrolytically stable oil soluble boron compound selected from the group consisting of: $B(OR)_3$, $R'B(OR)_2$ and $R_2B(OR)$ in which R and R' are radicals having at least 6 carbon atoms selected from the group consisting of alkyl, cycloalkyl, aryl, aralkyl, alkaryl; R being the same or different in a given compound and R' also representing hydrogen; boric, boronic, and borinic acid esters derived from alkane, alkane-diols, and alkanolamines; and amine borate adducts and amine salts of tetra-covalent boron compounds.

2. The process of claim 1, which comprises applying from 4 to 500 liter of said oil per hectare.

3. The process of claim 1, wherein said esters are derived from secondary and tertiary mono- and di-hydroxy compounds.

4. The process of claim 1, wherein said compound is tri-(diisobutylcarbinyl)borate.

5. The process of claim 1, wherein said adduct is an compound of boro-tetra-n-propylate and a tert. alkyl primary amine.

6. The process of claim 1, wherein said adduct is an adduct of tri-(n-propyl)borate and a tert. alkyl primary amine.

7. The process of claim 1, wherein said compound is tricyclohexylborate.

8. The process of claim 1, wherein compound is tri-propanolamine borate.

9. The process of claim 1, wherein said compound is tri-(diisopropylcarbinyl)borate.

10. The process of claim 1, wherein said compound is di-(diisobutylcarbinyl)borate.

* * * * *